United States Patent [19]

Bangert

[11] Patent Number: 4,643,277

[45] Date of Patent: Feb. 17, 1987

[54] BRAKE SHOE ARRANGEMENT AND A METHOD OF MANUFACTURING A BRAKE SHOE

[75] Inventor: Dieter Bangert, Frankfurt am Main, Fed. Rep. of Germany

[73] Assignee: Alfred Teves GmbH, Frankfurt am Main, Fed. Rep. of Germany

[21] Appl. No.: 753,662

[22] Filed: Jul. 10, 1985

[51] Int. Cl.⁴ ............................................. F16D 66/00
[52] U.S. Cl. ................................ 188/1.11; 188/73.38; 188/234; 72/340; 72/334
[58] Field of Search ................... 188/1.11, 73.1, 73.31, 188/73.38, 234, 250 B, 250 G, 253, 250 E; 72/334, 335, 340

[56] References Cited

U.S. PATENT DOCUMENTS

| | | | |
|---|---|---|---|
| 2,991,552 | 7/1961 | Chatfield | 72/340 |
| 3,399,560 | 9/1968 | Connolly et al. | 72/334 X |
| 4,356,717 | 11/1982 | Okunishi et al. | 72/334 X |
| 4,469,205 | 9/1984 | Stoka et al. | 188/234 |
| 4,537,291 | 8/1985 | Thiel et al. | 188/1.11 X |

FOREIGN PATENT DOCUMENTS

| | | | |
|---|---|---|---|
| 3132954 | 2/1983 | Fed. Rep. of Germany | 188/1.11 |
| 2107013 | 4/1983 | United Kingdom | 188/1.11 |

*Primary Examiner*—Douglas C. Butler
*Assistant Examiner*—Matthew C. Graham
*Attorney, Agent, or Firm*—James B. Raden; William J. Michals

[57] ABSTRACT

A brake shoe arrangement for disc brakes for motor vehicles, and a method for the production thereof, comprising a brake shoe (2) including an anchor plate (4) having a friction pad (6), secured thereto and comprising a wire brake shoe spring (18) formed as a stem spring and including at least two winding sections (20,22) from which emerges one free spring stem, with the brake shoe spring (18) being inserted into at least one recess (12,14) of the anchor plate such that one winding section is located on one side of a bridge-type projection (16) provided in the recess. The projection extends substantially in parallel to the anchor plate. In order to provide a safe support for pad-wear warning contact (10), the bridge-comprising (16) forms a substantially closed ring comprising a continuous aperture (34).

1 Claim, 4 Drawing Figures

BRAKE SHOE ARRANGEMENT AND A METHOD OF MANUFACTURING A BRAKE SHOE

BACKGROUND OF THE INVENTION

This invention relates to a brake shoe arrangement having a pad-wear warning contact and a method of manufacturing a brake shoe.

A brake shoe arrangement of this type is disclosed in German patent document DE 31 39 942.8. In this conventional arrangement, the recess in the anchor plate is radially open to the outside and only a winding section of the brake shoe spring bridges the open zone. In that arrangement, it is not possible for a plug-in pad-wear warning contact to be secured in an operationally safe and satisfactory manner.

It is, therefore, an object of the present invention to improve a brake shoe arrangement of the type described wherein a plug-in pad-wear warning contact can be safely secured to the anchoring plate.

SUMMARY OF THE INVENTION

In the present invention, this problem is solved in that the bridge-type projection forms a substantially closed ring including a continuous aperture for holding a pad-wear warning contact. The invention provides a low-cost brake shoe arrangement in which the spring can be safely secured to the anchor plate without requiring any additional fixing elements, and in which a plug-in wear warning contact is safely held in the anchor plate with no need for additional elements.

German patent document DE-OS 28 13 244 discloses a brake shoe arrangement for brake discs in which a brake shoe spring, by means of a hollow rivet, is secured in a bore of a brake shoe anchor plate, with the hollow rivet also serving to receive a plug-in pad-wear warning contact. However, to secure both the spring and the warning contact in that arrangement, an additional element is required along with the hollow rivet, thereby rendering the arrangement unnecessarily expensive which is particularly disadvantageous because brake shoe arrangements are mass production products.

In an advantageous embodiment of the invention, an arrangement is provided in which the recess and the bridge-type projection are of a substantially U-shaped configuration, the legs of the U-shaped projection are interconnected by a connecting section in order to form a closed ring. The connecting section is not placed at the edge of the recess but rather slightly radially inwardly toward the bottom of the recess so that the connecting section and the legs of the projection confine a substantially U-shaped recess radially open and through which a section connecting the two spring sections are guided. In order to hold the spring even more securely, the projection in the area of the continuous aperture forms an axially extending lug backed by the spring in assembled condition.

The pad-wear warning contact comprises a holding portion conforming to the continuous aperture. The holding portion is provided with a locking member, such as a snap ring or the like, in jumping relationship, radially behind a shoulder formed on the continuous aperture to accommodate the warning contact.

The shoulder is advantageously formed wherein the continuous aperture is of a stepped configuration to permit the locking element to back the shoulder formed by the step. For economy and low manufacturing cost the bridge-type projection and the closed ring are formed by plastic deformation of the anchor plate material.

The invention also provides a method of manufacturing a brake shoe arrangement of the type described. The method includes the steps of providing in the anchor plate a continuous recess, the cross-section of which is smaller than the cross-section of the recess forming the step-type projection, and compressing the anchor plate, in the area of the recess forming the bridge-type projection, by means of a ram tool so that the recess of recesses containing the projection is (are) formed, with a portion of the material flowing into the area of the connecting section. In the practice of the invention, the radially open recess can always simultaneously be punched along with the continuous aperture. As an alternative, the continuous aperture also can be produced by means of a stepped drill.

BRIEF DESCRIPTION OF THE DRAWING

Various other objects, features and attendant advantages of the invention will be more fully understood from the following description when taken in conjunction with the accompanying drawing wherein.

DETAILED DESCRIPTION

Figure 1:
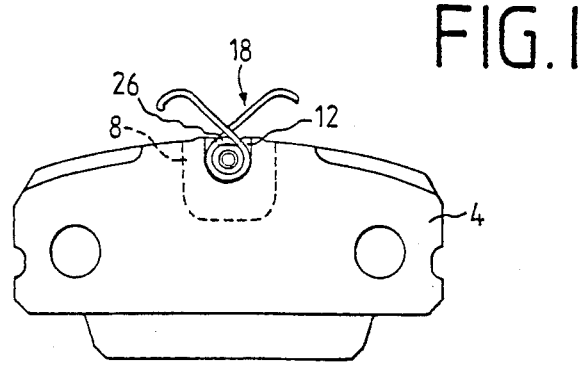
FIG. 1 shows a brake shoe arrangement, viewed from the side of the anchor plate.
Figure 2:
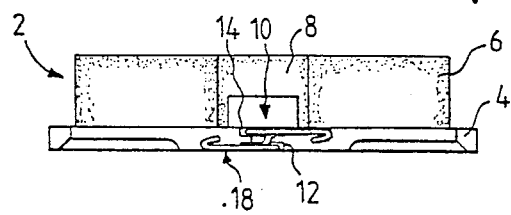
FIG. 2 is a plan view of the brake shoe arrangement according to FIG. 1.

The brake shoe arrangement as illustrated in the drawing comprises a brake shoe 2 made up of an anchor plate 4 and a friction pad 6 secured thereto. The friction pad 6, in the central area radially outwardly thereof, is provided with a recess 8 disposed in which is a pad-wear warning contact 10 (shown in dashed lines in FIG. 2). The depth of the pad-wear warning contact 10 is less than that of the friction pad 6 and is so dimensioned as to cause the brake disc (not shown) after wear of the friction pad to a predetermined depth to get into contact with conductors (not shown) as disposed in warning contact 10 thereby generating a warning signal.

Figure 3:
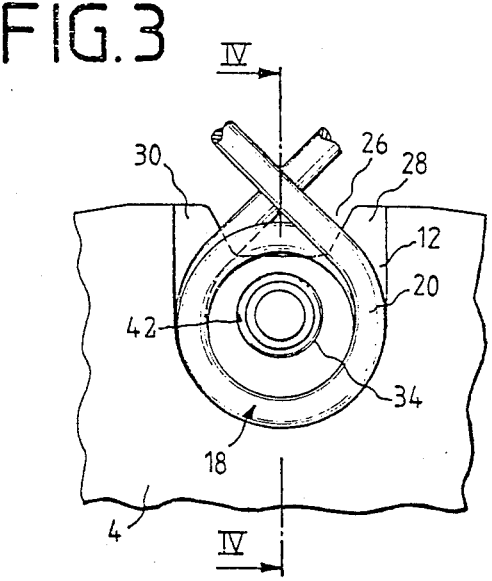
FIG. 3 is an enlarged view of the securing zone of the brake shoe spring.
Figure 4:
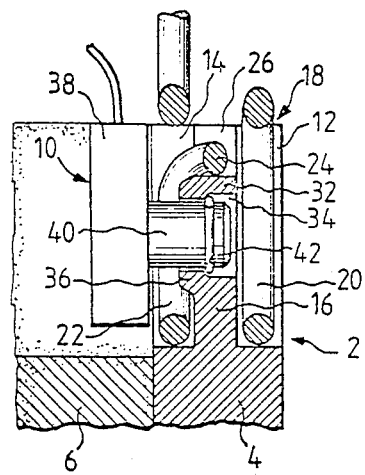
FIG. 4 is a sectional view of the area of the brake shoe spring according to FIG. 3 along the line IV—IV of FIG. 3, with a pad-wear warning contact inserted therein.

As shown in FIGS. 3 and 4, in the central area of the anchor plate 4, two oppositely arranged U-shaped recesses 12,14 are provided which are spaced apart from one another by a projection 16 disposed therebetween. A wire brake shoe spring 18 formed as a stem spring is so disposed in recesses 12,14 that one winding section 20 is located in said one recess 12 and another winding section 22 is located in said opposite recess 14. The two winding sections 20,22 are interconnected by a spring section 24 which, via a substantially U-shaped recess 26 radially open to the outside, in projection 16, is guided from recess 12 to recess 14. The winding sections 20,22 are in resiliently biased abutment with projection 16. In addition, a form-locking connection can be established as described in the following. Projection 16 equally is of a substantially U-shaped configuration except that the two legs 28,30 are interconnected by a connecting section 32 causing the projection to form a closed ring, with a connecting section 32 being so arranged that in the radially outward direction, the U-shaped recess 26 is left. Projection 16 is provided with a continuous bore 34 formed as a stepped bore, with the bore section of smaller diameter facing the friction pad 6. Toward that side, projection 16 in the area of bore 34 also forms an axially extending lug 36. As shown by FIG. 4, the brake shoe spring 18 is disposed concentrically of that lug 36, with the said lug 36 projecting into the interior of the chamber confined by the winding section 22 so as to safely hold the spring in recesses 12,14.

The pad-wear warning contact 10 comprises a contact body 38 and a cylindrical holding portion 40. The cylindrical holding portion 40 extends through the winding section 22 of the brake shoe spring 18 to engage the stepped bore 34, with the bore section of smaller diameter of the stepped bore 34 forming the guide for the said holding portion 40. Provided on the front end of the holding portion 40 is an annular groove disposed in which is a snap ring 42 in abutment with a shoulder formed in the bore 34 in the transitory area from the section of smaller diameter to the section of larger diameter thereby holding the warning contact 0 on the anchor plate 4 in radially and axially nondisplaceable manner.

For manufacturing the brake shoe arrangement, a continuous recess in the form of an elongated hole radially open to the outside is provided in the anchor plate 4, centrally of recesses 12,14 to be formed. The cross-section of the said recess is smaller than the cross-section of the recesses 12,14 to be formed. The anchor plate, by means of a ram tool, in the area of the recesses 12,14 is then axially compressed to thereby form recesses 12,14 and projection 16 remaining therebetween. At the same time, part of the plastically deformed material of the anchor plate, in the circumferential direction, will flow inwardly so that during this deformation, also connecting section 32 is formed, with the continuous recess being substantially reclosed, enabling a portion of the material to flow over the radially outward delimitation of the anchor plate 4. In a subsequent punching operation the zone for providing the recess 26 can be removed again. Along with recess 26, a continuous aperture can be simultaneously provided in the projection 16 which, subsequently, is drilled open to form stepped bore 34.

What is claimed is:

1. A brake shoe assembly comprising:
   an anchor plate;
   a friction pad secured to said anchor plate;
   said anchor plate being formed with a recess for accommodating a brake shoe spring winding;
   said friction pad being formed with a recess for accommodating a pad-wear warning contact assembly;
   said friction pad recess being juxtaposed to said anchor plate recess;
   a pad-wear warning contact assembly received within said friction pad recess;
   a substantially planar projection integrally secured to said anchor plate and extending into said anchor plate recess;
   a brake shoe spring wire including at least one coil extending into said anchor pad recess between said planar projection and said pad-wear warning contact;
   said planar projection extending across the center of said wire coil and being formed with a 360-degree-bounded through bore adjacent said wire coil;
   and a dual-purpose holding member supporting said pad-wear contact assembly in said friction pad recess, said holding member passing through said wire coil for retaining said coil in said anchor plate recess, and being mounted within said through hole of said planar projection.

* * * * *